US010305888B2

(12) United States Patent
Grosskopf

(10) Patent No.: US 10,305,888 B2
(45) Date of Patent: *May 28, 2019

(54) SECURE DATA ENTRY VIA AUDIO TONES

(71) Applicant: Dell Products L.P., Round Rock, TX (US)

(72) Inventor: Gabriel Jakobus Grosskopf, Palo Alto, CA (US)

(73) Assignee: Dell Products L.P., Round Rock, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/089,105

(22) Filed: Apr. 1, 2016

(65) Prior Publication Data

US 2016/0219037 A1 Jul. 28, 2016

Related U.S. Application Data

(63) Continuation of application No. 14/451,753, filed on Aug. 5, 2014, now Pat. No. 9,369,462.

(51) Int. Cl.
| | |
|---|---|
| *H04L 29/06* | (2006.01) |
| *G06F 17/28* | (2006.01) |
| *H04L 29/08* | (2006.01) |
| *H04W 12/06* | (2009.01) |
| *G06F 21/31* | (2013.01) |
| *H04W 12/08* | (2009.01) |
| *H04W 4/80* | (2018.01) |
| *G06F 21/42* | (2013.01) |
| *G06Q 20/34* | (2012.01) |

(52) U.S. Cl.
CPC ............ *H04L 63/083* (2013.01); *G06F 17/28* (2013.01); *G06F 21/31* (2013.01); *H04L 67/10* (2013.01); *H04W 4/80* (2018.02); *H04W 12/06* (2013.01); *H04W 12/08* (2013.01); *G06F 21/42* (2013.01); *G06Q 20/341* (2013.01)

(58) Field of Classification Search
CPC ..... G06F 21/31; H04L 63/0853; H04L 67/42; G06Q 20/341
USPC .................................................. 725/7; 726/7
See application file for complete search history.

(56) References Cited

U.S. PATENT DOCUMENTS

| | | | |
|---|---|---|---|
| 5,907,597 A | 5/1999 | Mark | ............................ 340/5.84 |
| 6,014,441 A * | 1/2000 | Mark | .................... G06Q 20/341 |
| | | | 379/283 |
| 7,003,501 B2 | 2/2006 | Ostroff | ............................ 380/30 |
| 7,292,680 B1 * | 11/2007 | Simpson | .............. G06Q 20/401 |
| | | | 370/353 |
| 2003/0070091 A1 * | 4/2003 | Loveland | .............. H04L 63/104 |
| | | | 726/12 |

(Continued)

*Primary Examiner* — Bryan F Wright
(74) *Attorney, Agent, or Firm* — Baker Botts L.L.P.

(57) ABSTRACT

A cloud client device identifies one or more devices within a predetermined range of the cloud client device operable to communicate with the cloud client device. The cloud client device pairs with one or more of the devices. To provide secure access to the cloud client device and to other functionality provided by the paired devices, the cloud client device accepts tones as a password. The cloud client device receives a password after a prompt as one or more tones and translates the tones for comparison with the password for the cloud client device. Access is allowed if the translated tones match the password for the cloud client device.

20 Claims, 6 Drawing Sheets

(56) References Cited

U.S. PATENT DOCUMENTS

| | | | |
|---|---|---|---|
| 2003/0212790 A1* | 11/2003 | Thambidurai | G06Q 30/02 709/225 |
| 2004/0133789 A1 | 7/2004 | Gantman et al. | 713/189 |
| 2004/0221166 A1* | 11/2004 | Steenstra | G06Q 20/341 713/182 |
| 2005/0010777 A1* | 1/2005 | Gantman | G06F 21/34 713/176 |
| 2006/0041756 A1* | 2/2006 | Ashok | G06F 21/31 713/183 |
| 2007/0250920 A1* | 10/2007 | Lindsay | G06F 21/31 726/7 |
| 2007/0293194 A1 | 12/2007 | Bisht | 455/411 |
| 2010/0024018 A1 | 1/2010 | Koziol | 726/7 |
| 2011/0047607 A1 | 2/2011 | Chen et al. | 726/7 |
| 2011/0123008 A1* | 5/2011 | Sarnowski | H04L 63/0853 379/93.02 |
| 2012/0025950 A1 | 2/2012 | Von Tippelskirch | 340/5.74 |
| 2012/0252414 A1 | 10/2012 | Ishidoshiro | 455/411 |
| 2013/0006806 A1* | 1/2013 | German | H04L 67/14 705/26.8 |
| 2013/0070566 A1 | 3/2013 | Kutsuwada et al. | 367/199 |
| 2013/0185815 A1 | 7/2013 | Leotsarakos | 726/30 |
| 2014/0033045 A1 | 1/2014 | Kshirsagar | 715/728 |
| 2014/0161241 A1* | 6/2014 | Baranovsky | H04M 3/51 379/142.05 |
| 2014/0196137 A1* | 7/2014 | Schwebke | H04L 67/42 726/9 |
| 2015/0156816 A1* | 6/2015 | Engelhart, Sr. | H04W 88/06 455/552.1 |

* cited by examiner

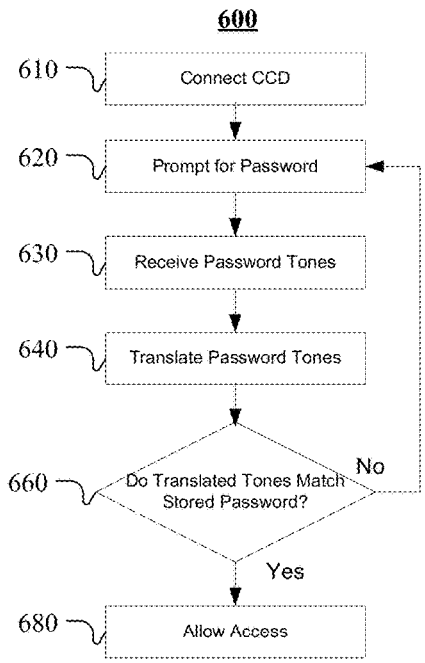
*FIG. 6*
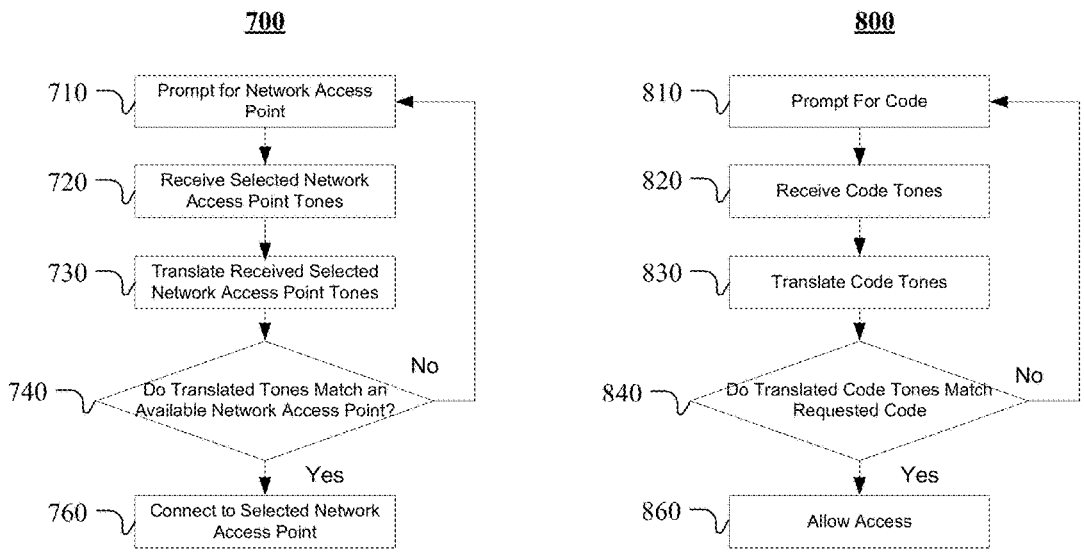
*FIG. 7*　　　　　　　　*FIG. 8*

SECURE DATA ENTRY VIA AUDIO TONES

CROSS-REFERENCE TO RELATED APPLICATION

This application is a continuation of application Ser. No. 14/451,753 titled "Secure Data Entry via Audio Tones," filed Aug. 5, 2014, which is incorporated herein by reference.

TECHNICAL FIELD

This disclosure relates generally to portable information handling systems and, more particularly, to wireless-enabled, portable devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which:

FIG. 6 is a flowchart depicting an example method for providing access to cloud client device using tones.

FIG. 7 is a flowchart depicting an example method for selecting a network available to a cloud client device using tones.

FIG. 8 is a flowchart depicting an example method for allowing access to information, software, or hardware using tones.

DESCRIPTION OF THE EMBODIMENTS

In the following description, details are set forth by way of example to facilitate discussion of the disclosed subject matter. It should be apparent to a person of ordinary skill in the field, however, that the disclosed embodiments are exemplary and not exhaustive of all possible embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, entertainment, or other purposes. For example, an information handling system may be a personal computer (e.g., desktop or laptop), tablet computer, mobile device (e.g., personal digital assistant (PDA) or smart phone), server (e.g., blade server or rack server), a consumer electronic device, a network storage device, or another suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more storage devices, one or more communications ports (e.g., network ports) for communicating with external devices as well as various input and output (I/O) devices, such as a keyboard, a mouse, a touchscreen and/or a video display. The information handling system may also include one or more buses operable to transmit communication between the various hardware components.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-5 wherein like numbers are used to indicate like and corresponding parts.

Figure 1:
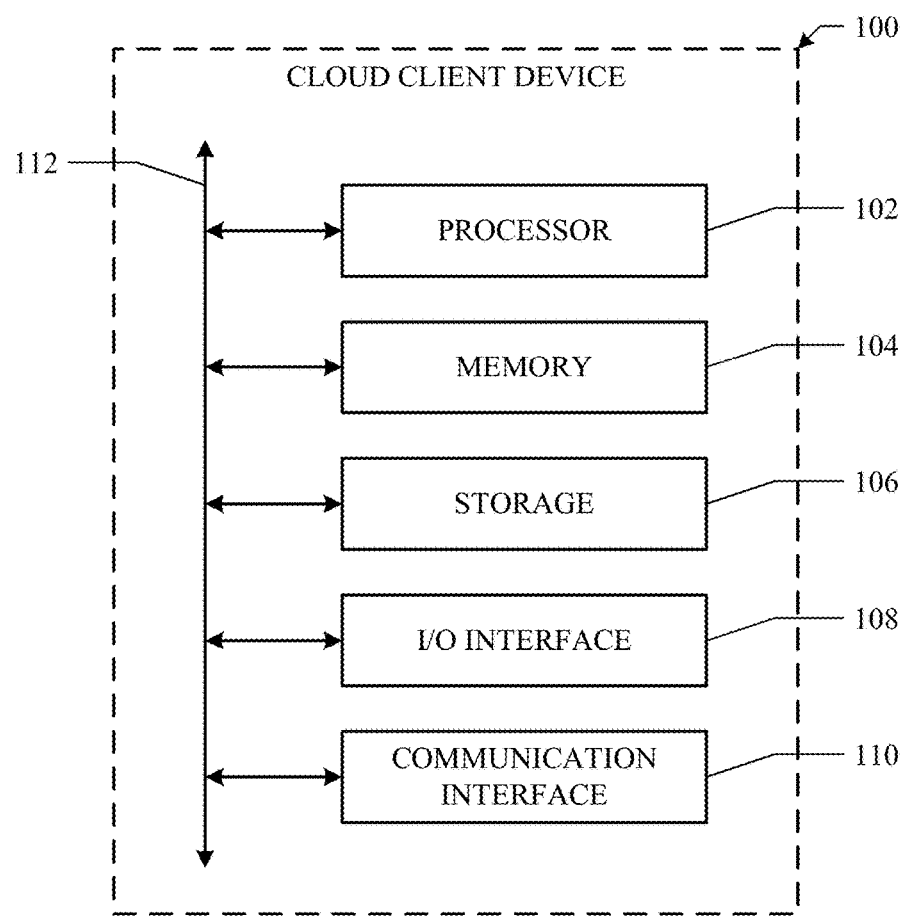
FIG. 1 is a block diagram of selected elements of an embodiment of a cloud client device.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As an example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

In particular embodiments, information handling system 100 comprises a cloud client device (CCD). A CCD may be a wireless-enabled, portable device that may include one or more processors 102 (e.g., dual core ARM processors), volatile memory 104 (e.g., RAM), non-volatile memory 104 (e.g., flash memory), input/output interfaces 108 (e.g., for display, for data, and for audio), networking/communications interfaces 110, and one or more operating systems (e.g., stored in memory 104 and operated on by processors 102). The input/output interfaces 108 may include display interfaces that support one or more of the Mobile High-Definition Link (MHL) standard, the High Definition Multimedia Interface (HDMI) standard, or the Display Port (DP) standard. The input/output interfaces 108 may also include one or more USB ports (e.g., standard, mini or micro USB), one or more removable memory slots (e.g., SD card slots), and audio capabilities through the MHL, HDMI, or DP interfaces. The CCD may include networking or communication interfaces 110 that support IEEE 802.11 protocols (including a, b, g, or n), single or dual band WiFi, BLUETOOTH communication, and near field communication (NFC). The CCD may include one or more operating systems, including versions of Android, Windows, Wyse ThinOS, Linux, or Apple iOS. The CCD may include one or more native applications, including, for example, a browser, a media player and recorder, voice over IP and video communication software, and software for remote access to cloud services or other remote content or services. The CCD may plug directly into a device (e.g., a display device such as a television, monitor, or projector), may be connected via a cable (via one of the above-described interfaces) to a device, or may be connected via a wireless interface to a device (e.g., a display or client device). A user may, for example, use the CCD to securely communicate; access files or contents that are on the CCD, on another local device, or on a remote device (e.g., in a server of a cloud services organization); or control, interact with, or mediate one or more local devices (e.g., client devices) or remote devices (e.g., remote client devices). The CCD may be remotely provisioned, authenticated, and controlled including, for example, by a cloud service.

Figure 2:
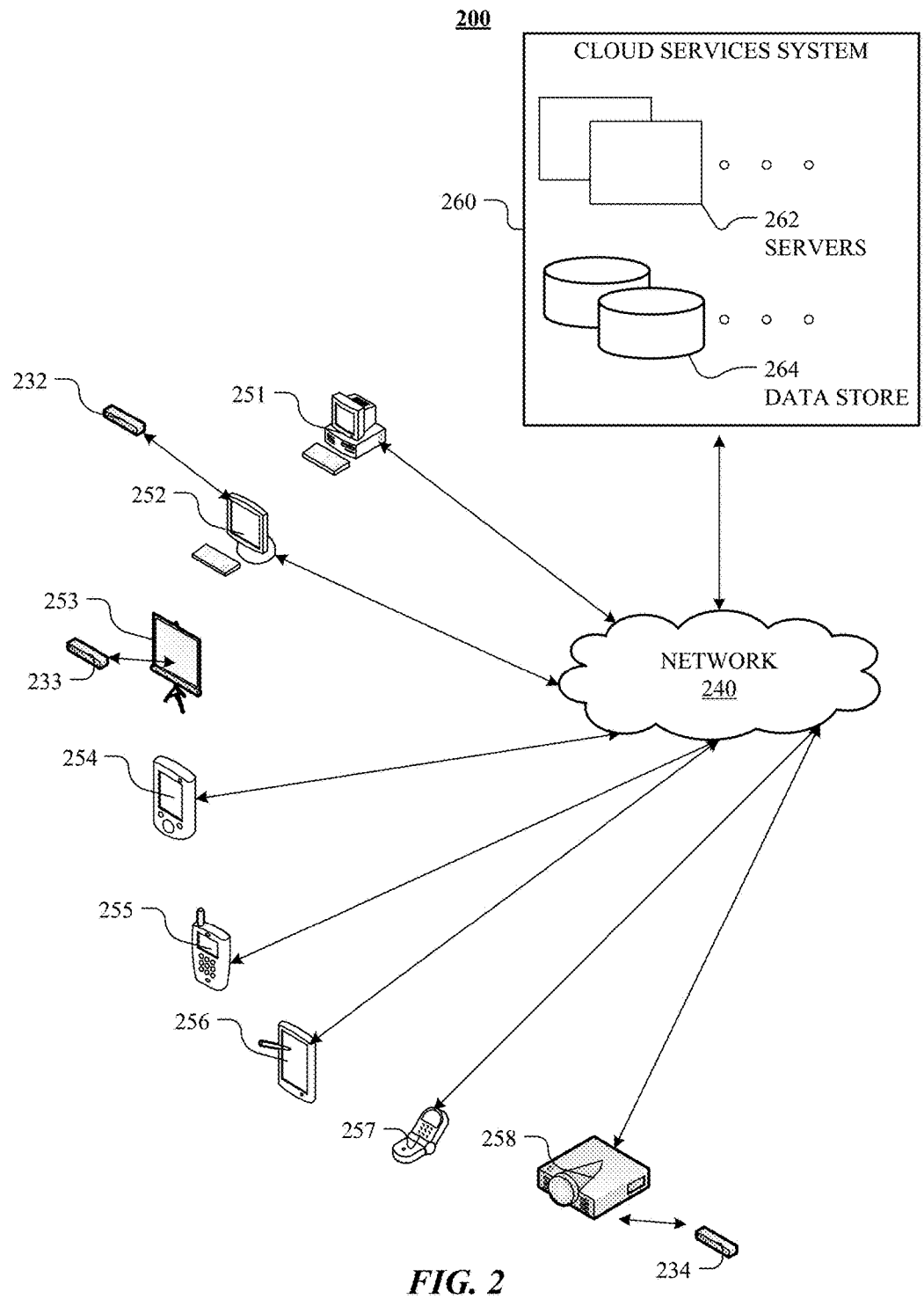
FIG. 2 is an example of a network environment in which a cloud client device may operate.

FIG. 2 illustrates an example network environment 200 in which a CCD may operate with other local or remote devices. In the example of FIG. 2, multiple devices and displays (e.g., elements 251, 252, and 254-258) are communicatively coupled (e.g., in any suitable wired or wireless fashion) to a network 240. Network 240 may be any suitable type of network including, for example, an ad hoc network, a personal area network (PAN), a local area network (LAN), a wide area network (WAN), a metropolitan area network (MAN), or one or more portions of the Internet or a combination of two or more of these network types. One or more portions of network 240 may be wired or wireless. As an example, network 240 may include portions of a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

As shown in FIG. 2, Network 240 may allow devices and displays coupled to it (e.g., elements 251, 252, and 254-258) to communicate with a cloud services system 260. Cloud services system 260 may, for example, include one or more servers 262 and a data store 264 including one or more data storage systems. Network 240 may also allow devices and displays coupled to it to communicate with each other. Although not illustrated in FIG. 2, one or more of the devices and displays of network environment 200 may, in particular embodiments, communicate with each other directly (e.g., wirelessly) or via any other suitable communication method.

In the example of FIG. 2, CCD 232 is coupled locally to computing device 252, CCD 233 is coupled locally to display 253, and CCD 234 is coupled locally to projector 258. As an example, CCD 232 may be wirelessly coupled to computing device 252 (e.g., via BLUETOOTH), CCD 233 may be coupled to display 253 via, for example, a USB port, and CCD 234 may be coupled to projector 258 via, for example, HDMI. Additionally, CCD 232, CCD 233, and CCD 234 may each communicate (or be coupled) with one another or with one or more devices or displays (e.g., elements 251-258) locally or directly (e.g., via NFC or BLUETOOTH), via their respective coupled devices (e.g., 252, 253, 258), via network 240, or via any other suitable communication method. Furthermore, CCD 232, CCD 233, and CCD 234 may each communicate with network 240 directly via any suitable communication method, without need of being coupled to a device (e.g., a display or a computing device).

In particular embodiments, the CCD is enabled to provide a wireless, remote interface for multi-platform control and mediation of one or more client or display devices (e.g., 251-258). The wireless, remote interface provided by the CCD may use any type of suitable wireless technology or standard including, but not limited to, IEEE 802.11 (a), (b), (g), and (n), WPS (Wi-Fi Protected Setup), BLUETOOTH, 3G and 4G mobile communication, and NFC. The platforms for each of the client or display devices (e.g., 251-258) may be the same or different and may include (by way of example and without limitation) Apple iOS, Microsoft Windows, Android, Wyse ThinOS, or Linux. Furthermore, each of the client or display devices (e.g., 251-258) may include a software application configured to interact with the CCD (e.g., 232, 233, or 234) or with other client or display devices.

The CCD may function with a client device (e.g., a keyboard, mouse, tablet, computer, or phone) and enable remote events at the client device to interact with or control the CCD, a remote client device, or a display device (e.g., a television, projector, or monitor). As an example, a wireless keyboard or mouse may be used with the CCD, with a remote display device displaying the input from the keyboard or mouse. As another example, CCD 233 may be coupled to display 253, and remote touch events from tablet 256 may control what is displayed on display 253. As another example, CCD 232 may be coupled to computer 252, and input (e.g., data or I/O from peripherals) may be directed by CCD 232 from computer 252 to display 253, tablet 256, and projector 258 simultaneously. In particular embodiments, inputs from a single client device (e.g., phone 254) may be communicated to the CCD (e.g., 232, 233, or 234), such that the user of the client device maintains control over the CCD (and a display device coupled to the CCD, e.g., monitor of computer 252, display 253, or projector 258), with the effect that the client device acts as a flexible wireless input device for the CCD. As an example, in a classroom setting, content displayed on an instructor's tablet client device (e.g., 256) may be shared with students via the CCD (e.g., 233) by having the display device (e.g., 253) simultaneously display or mirror the display of the instructor's tablet client device. The instructor may control the CCD via the tablet and manipulate the content shown on the display by using gestures (e.g., touch or multi-touch), soft keyboards, or touchpad functionality on the tablet.

In other embodiments, multiple client devices (e.g., keyboards, mice, etc.) may be used with one CCD, with the inputs from one or more of these devices simultaneously being processed by the CCD and in some circumstances displayed on one or more display devices. As an example, again in a classroom setting, an instructor may use a tablet client device, a first student may use a smartphone softkeyboard, and a second student may use a BLUETOOTH keyboard, and the inputs from all of these devices may be received by a CCD and displayed on a display device such as a monitor. As yet another example, multiple people using multiple client devices (e.g., tablets or smartphones) may together play a single game (e.g., streamed from the Internet via the CCD) displayed on a single display device, with the inputs from each of the devices going to the CCD.

In particular embodiments, the CCD may be enabled to function with one or more multifunction display devices, such as multi-touch-enabled displays and/or displays with integrated webcams, speakers, microphones, etc. As an example, if the CCD is paired with a touch monitor (e.g., via a wired or direct plug-in connection to the monitor such as USB/MHL/HDMI, or via BLUETOOTH, NFC, or any other wireless technology), the CCD may be configured to operate directly with the display device, allowing a user to input touch gestures directly on the display device and interact with data displayed on the display device by the CCD. For example, if the user is navigating a website using a browser via the CCD, and the CCD is paired with a touch display device, the user may directly touch the display device to interact with the website, and the CCD will recognize and properly process the touch inputs. In other embodiments, the user may operate both a touch display device and one or more separate client devices (e.g., mouse, keyboard, tablet, or smartphone) simultaneously, such that the user may input data via any or all of the client devices or display devices.

In particular embodiments, the CCD may be enabled to function in a unified communications framework. As an example, the CCD may be enabled to function with services such as instant messaging (e.g., including presence information), telephony (e.g., IP telephony), video conferencing, data sharing (including Interactive White Boards), IPTV, call control (e.g., for VoIP), speech recognition, and unified messaging. In particular embodiments, the CCD may be enabled to function with (e.g., send data to and receive data from) one or more display devices that include cameras. As an example, if the CCD is paired with a television including a camera (e.g., a built-in camera or webcam), microphone (e.g., built-in or attached as a USB peripheral), and an audio out (e.g., built-in speakers or speakers attached as peripherals), the CCD may be configured to operate directly to allow a user to engage in videoconference calls. The configuration may, for example, occur in conjunction with a cloud services provider (e.g., cloud services system 260), described further herein. As an example, the cloud services provider may allow the CCD to set up a SKYPE session, and link the user of display 253 to another user via the videoconference. The CCD may operate with various types of display devices with various types of functionality including, but not limited to, multi-touch gestures, GPS or other location data, audio functionalities (including microphones and speakers), or camera input. In some embodiments, the CCD is enabled to communicate with such additional components of the multi-function display device via the same interface over which it sends display information (e.g., MHL via an HDMI interface). In other embodiments, the CCD is enabled to communicate with such components via an interface distinct from the display interface (e.g., the CCD may send display information to the display device via an HDMI connection and may receive multi-touch input information from the display device via a separate USB connection).

In particular embodiments, the CCD is enabled to provide a wireless, remote interface including gesture redirection (e.g., touch or multi-touch gestures) or input/output redirection (e.g., of any suitable type including those listed herein) in conjunction with one or more devices. The CCD, for example, may provide a virtualized touch interface. The CCD may function with a client device (e.g., a smartphone, tablet, laptop, etc.) to redirect multi-touch gestures from the client device to control or otherwise interact with a display device or another client device. For example, a user of a smartphone may swipe, fling, use multiple-finger touch inputs (including, e.g., from a soft-keyboard), pinch-to-zoom, scroll, etc. on the smartphone. These multi-touch gestures may be received by the CCD (e.g., by a multi-touch client receiver) and used to control or interact with one or more display devices or client devices (e.g., via a multi-touch gesture proxy controller and a native display driver of the display device). As an example, input from one client device (e.g., a user's pinching multi-touch gesture at tablet 256) may be sent to a CCD (e.g., 232), which then exports the input to control the operation of another client device (e.g., to cause a zoom in on an image displayed in a browser running on computer 252). In this example, the output displayed on computer 252 may then be sent to the CCD 232 and displayed on tablet 256. As described above, multiple client devices may be used with one CCD in certain embodiments, with the multi-touch inputs from one or more of these devices being simultaneously displayed or used to control on one or more display or client devices.

The types of input gathered from client devices (e.g., 251-258) may be any type of input including, but not limited to, gestures (e.g., touch or multi-touch gestures, described herein), keyboard input, mouse input, accelerometer input, gyroscope input, GPS or other location data, camera input (video or still images), sound input (e.g., from a microphone), or input from any suitable type of sensor including, e.g., acoustic, sound, vibration, chemical, electric, magnetic, radio, environmental, navigation, optical, pressure, temperature, or proximity sensors. Any suitable input from a client device may be sent to a CCD, which may then send this input to any other client device (including any peripheral or other component of the client device), display device, remote device, etc. As an example, a user's voice input at phone 255 may be sent to a CCD (e.g., 233) which then sends that voice data to be played on a speaker at computer 251.

In particular embodiments, a CCD may be configured to translate inputs between devices. In this manner, resources, features, and functionality of one device may be made available to another device via mediation by the CCD using, for example, a transparent wireless transport protocol (e.g., WiFi or BLUETOOTH). For example, inputs received at a first device, such as a smartphone, may be intercepted, communicated to the CCD, translated into a format understood by a second device or application, and provided to that second device or application. As an example, a gesture or an input may be translated to multi-touch at a device, and vice versa. As another example, voice input from a first device (e.g., at a microphone) may be translated to text at a second device, and vice versa. As yet another example, a gesture at a first device (e.g., captured by a camera) may be translated to an action (e.g., scrolling) at a second device. In some cases, the device or application receiving the remote inputs may be able to receive and process those inputs in their original format. In such cases, the inputs need not necessarily be translated, but may be redirected by the CCD.

In particular embodiments, a CCD may be configured to provide virtual sensors (or other functionality) to a client device or display (e.g., in a manner similar to a virtual USB hub). As an example, if CCD 233 is coupled (e.g., plugged into a USB port) with display 253, then CCD 233 may dynamically construct a virtual set of sensors and other devices (e.g., 251, 252, and 254-258) for use by display 253. That is, CCD 233 may determine what other devices (and what sensors on those devices) are available for pairing by, for example, conducting a scan to see if the local network contains pairable devices (e.g., devices within a communication range for pairing). For those pairable devices, the CCD 233 may request the devices to enter a pairing mode and then scan (e.g., NFC tags, or other pairing methods) to construct a model of available devices or sensors (e.g., a mesh). The CCD 233 may then pair those with display 253 and provide functionality or services from those devices or sensors to display 253. As an example, CCD 233 may couple a phone (e.g., 254) with display 253, such that if a user at display 253 using CCD 233 needs her location information (e.g., to authenticate an account with cloud services system 260), the GPS module of phone 254 may be seamlessly used to provide location information and authenticate CCD 233. In this manner, a user need not manually couple or otherwise pair local devices, download drivers manually, or do other manual configurations of CCD 233 or display 253.

In particular embodiments, the CCD may be enabled to operate in conjunction with cloud (or other remote or virtualized) services. As examples, the CCD may include software that enables it to function with the Dell Wyse Cloud Client Manager or Dell Wyse PocketCloud software, or any other suitable remote or cloud service.

As an example, the CCD may be enabled to operate with a cloud service (e.g., 260) such as the Dell Wyse Cloud Client Manager (Dell CCM). Through the cloud service, the CCD may be remotely provisioned and authenticated. The cloud service may provide, for example and without limitation, access to data, applications, services, or remote desktops.

In particular embodiments, the CCD may be authenticated using a variety of methods including WiFi Protected Setup (e.g., by using a WPS certified router to establish connectivity to the cloud service), an SD Card or USB source (or any other local source) of a configuration file, or a client device. As an example, a token stored on a particular client device may be required to authenticate a user attempting to access a CCD. When the client device (e.g., a smartphone, tablet, laptop, etc.) supporting BLUETOOTH, NFC, or other wireless technology is brought into proximity with the CCD, the CCD may obtain a secure or encrypted token (e.g., an RSA token) from the client device over the wireless interface. Once this secure token is obtained, the CCD may then authenticate its credentials with the cloud service.

The CCD may, for example, send particular data to the cloud service for authentication. The data may include, for example, the security token, location of the CCD (determined, e.g., based on data from a GPS transmitter of the CCD or MAC address scanning), an IP address of the CCD, a MAC address of the CCD, a usage log of usage behavior or statistics associated with the CCD, software or hardware versions of components of the CCD, etc. Based on the data received from the CCD, the cloud service may construct a profile associated with the CCD (e.g., stored in data store 264) or, alternatively, find and analyze (e.g., via servers 262) an existing profile associated with the CCD. For example, the CCD may be associated with a particular user of the cloud service, and particular security, authentication, quality-of-service, access, encryption, or other settings or data may be associated with the user in the user profile for the cloud service. The profile associated with a CCD in the cloud service may be specific to a user associated with the CCD, an entity associated with the CCD (e.g., a corporate profile with corporate settings), or any other individual, group of individuals, or organization associated with the CCD. Furthermore, if the CCD is not associated with a profile in the cloud service, the cloud service may use certain default settings to authenticate or provision the CCD.

In particular embodiments, when the cloud service receives data from the CCD, the cloud service may determine which user the CCD is associated with (e.g., based on a MAC address of the CCD), examine the profile for this user, and authenticate and provision the CCD based on data in this profile. As an example, the cloud service may determine that the CCD is associated with a user whose profile only allows cloud service access within a particular geographical region. If, for example, the CCD is presently in South America (as determined, for example, from the CCD's IP address or by approximating the location of the CCD by analyzing the wireless networks within the range of the CCD), but the profile for the user associated with the CCD allows CCD access to the cloud service and data only within North America, then the cloud service may refuse to authenticate the CCD. Any appropriate security measure may be enforced by the cloud service based on data associated with the CCD or the cloud service user profile. As another example, the user profile may include white- or black-lists that detail websites, cloud services or applications that the user may be able to access (or may be denied access to) depending on the location of the CCD or depending on other information associated with the CCD (e.g., processes currently running on the CCD).

In addition to allowing or denying access to cloud services or applications, the CCD may be remotely wiped (e.g., to a reset or clear state for re-imaging), locked, or queried (e.g., a query to determine the location of the CCD) by the cloud service, including, e.g., by a cloud service administrator. In particular embodiments, the CCD may be remotely wiped if another client device (e.g., a smartphone) is not within a particular range of the CCD. In particular embodiments, a specific standard method for wiping by overwriting the file system of the CCD may be employed such that the CCD may not be recoverable by a third party. This may be administered by the cloud service, or may be independently deployed. The CCD may be completely wiped (e.g., to factory settings) if certain conditions are met (e.g., if the cloud service determines the CCD should be wiped). In other embodiments, the CCD may be wiped in a manner that leaves all cloud-services-installed applications on the CCD but removes everything else. In particular embodiments, certain zones of the memory or storage of the CCD may be wiped, and in other embodiments, the entire CCD may be wiped.

The CCD may be fully imaged and the operating system of the CCD may be fully recovered via the cloud service even if the CCD is wiped or reset at an earlier time (e.g., by the cloud service for security reasons). The CCD may have any type of profile settings, content, or connections automatically pushed to it from the cloud service. The CCD may receive system updates from the cloud service including, for example, firmware or application updates. These updates may be determined based on information in the cloud service profile associated with the CCD, as well as information received from the CCD. The cloud service may also manage files on the CCD, as well as partition the CCD (e.g., into personal and corporate segments with separate profiles). The data transferred between the CCD and the cloud service may, for example, be encrypted using standard encryption, proprietary encryption, or a combination of both types. The cloud service may implement various policies or rules on the CCD after authenticating and provisioning the CCD. For example, the cloud service profile associated with a CCD may include policies related to quality-of-service, such that the cloud service may track data usage of the CCD and may implement quality-of-service data usage policies on the CCD. In addition to using the cloud service, the recovery of data on the CCD or the upgrading or updating of software on the CCD may be accomplished in the following ways:

1) Manually via the CCD itself (e.g., using a wireless interface in the CCD to automatically retrieve data, e.g., from a cloud service or from the Internet)
2) Connecting the CCD to a PC (e.g., obtaining data stored on the PC or using a web-based application on the PC to repair or update the CCD without needing to download any data to the PC)
3) Using data stored on a MicroSD (or other type of storage) card operable with the CCD, or
4) Using a purely web-based remote update mechanism to remotely send data to the CCD.

The CCD may be operable to access other types of remote networks or services, as well as cloud services. For example, the CCD may be fully pre-configured to access a virtual private network (VPN), for example by the owner of virtual private network (e.g., a corporation whose employees are issued pre-configured CCDs). Thus, in particular embodiments, the CCD may have automatic VPN provisioning without any need for user input or configuration. The automatic VPN provisioning may occur, in particular embodiments, through the authentication or provisioning process by a cloud service, described above, and may, for example, provision based on a user's profile. Additionally, in combination with other capabilities of the CCD described herein, a user at one location on the VPN network may connect to services from a device at another location on the VPN network (e.g., a printer in a private office network), allowing for any device to remote its functions over both local networks and VPNs, as well.

In particular embodiments, the CCD may be enabled to operate with multiple types of security protocols. As an example, the authentication of the CCD by receipt of a security token from a client device via BLUETOOTH or NFC (as described earlier in detail) may be a first level of security. A second level may be imposed through a cloud service authentication of the CCD (e.g., through the cloud service analysis of data provided by the CCD and through profile data associated with the CCD). Additionally, the links between the CCD and the cloud service (or any other links) may be encrypted using any suitable standard or proprietary encryption techniques. Finally, at any of these steps, a PIN or log-in may be required for a particular user using the CCD, as it is contemplated that multiple users may be associated with a single CCD, or that a single user may have separate profiles (e.g., work and personal) for a single CCD.

These security measures may enable the CCD to act as a portable and secure computing device even when highly confidential material is involved. Even if an unauthorized person obtains a CCD, obtains the client device with the secure token required for authentication of the CCD, and obtains all necessary log-in information to operate the CCD, the owner of the CCD may remotely disable and/or wipe the memory of the CCD via a cloud service (e.g., via Dell CCM). Moreover, as mentioned above, the CCD may be configured to automatically set up appropriate connections and communications sessions upon initialization and authentication, including automatic configuration of a VPN via a cloud service. A CCD may thus be configured to automatically present the user with a remote desktop (in conjunction with well-known virtualization and/or cloud computing software, such as that provided by Citrix and VMWare) that is similar to or identical to the desktop environment on the user's networked office computer. The CCD thus presents the possibility of low-cost, highly portable, highly secure, and broadly compatible computing.

The CCD may be enabled to operate with client-to-client software such as Dell Wyse PocketCloud software. The client-to-client software may, in particular embodiments, be used in conjunction with one or more cloud or remote services (e.g., the Dell Wyse Cloud Client Manager described above).

In particular embodiments, the CCD may be enabled to operate with client-to-client software that enables the CCD to see, communicate with, and otherwise interact with (or control) other client devices and their contents. As an example, multi-touch redirection, described above, may be implemented using the client-to-client software on the CCD and other devices. As an example, the CCD may include an application that allows the CCD to discover and access content across multiple client devices. Each of the devices may, for example, run an instance of the application, and each device may recognize and access other devices over BLUETOOTH, IEEE 802.11, ad-hoc wireless networking, IP networks, 3G or 4G connectivity, etc. The connection between these devices may, in particular embodiments, need not ever go to a cloud service, the Internet, or any other remote network and may, for example, be done entirely in a peer-to-peer fashion. In other embodiments, the connection between these devices may occur in part over a remote network. The client-to-client software may, for example, include a browser (e.g., Chrome) that allows the CCD and other devices to share a single content display (e.g., a single streaming video) as well as to share the control of content on one or more displays (e.g., a multi-player video game in which input is received from multiple client devices). The client-to-client software may allow the CCD and other devices to search and share applications or files (including video, audio, etc.); stream files; or copy, move, and backup files among each other. The client-to-client software may also allow the CCD and other devices to create a shared drive that is either public or private. The client-to-client software may, for example, also include auto-discovery, network management, file management (e.g., download, upload, copy, move, delete, rename, stream, or preview, etc.), and file transcoding (e.g., pause, play, fast forward, rewind, etc.) capabilities. The CCD may act as a router or central point through which any or all of the client-to-client activities or traffic may pass. In particular embodiments, the client-to-client software may also include an application (e.g., Dell Wyse Freezer, or any other HTML5 client) that allow the client devices to access proprietary applications (e.g., a remote Windows desktop, applications, or files) via a web application browser.

The CCD may be a low-power device. The CCD may receive power in accordance with the MHL 1.0 standard, or in accordance with subsequent revisions of the MHL standard. This allows the use of a single physical interface that may both provide power to the CCD and serve as the communications interface between the display device and the CCD. In other embodiments, the CCD may be powered via a separate interface, such as a USB port (e.g., connected to the display device or to another USB-enabled device), or via an A/C adapter. A CCD may also be configured to be broadly compatible and to receive power via any of these interfaces, depending on which is available.

Figure 3:
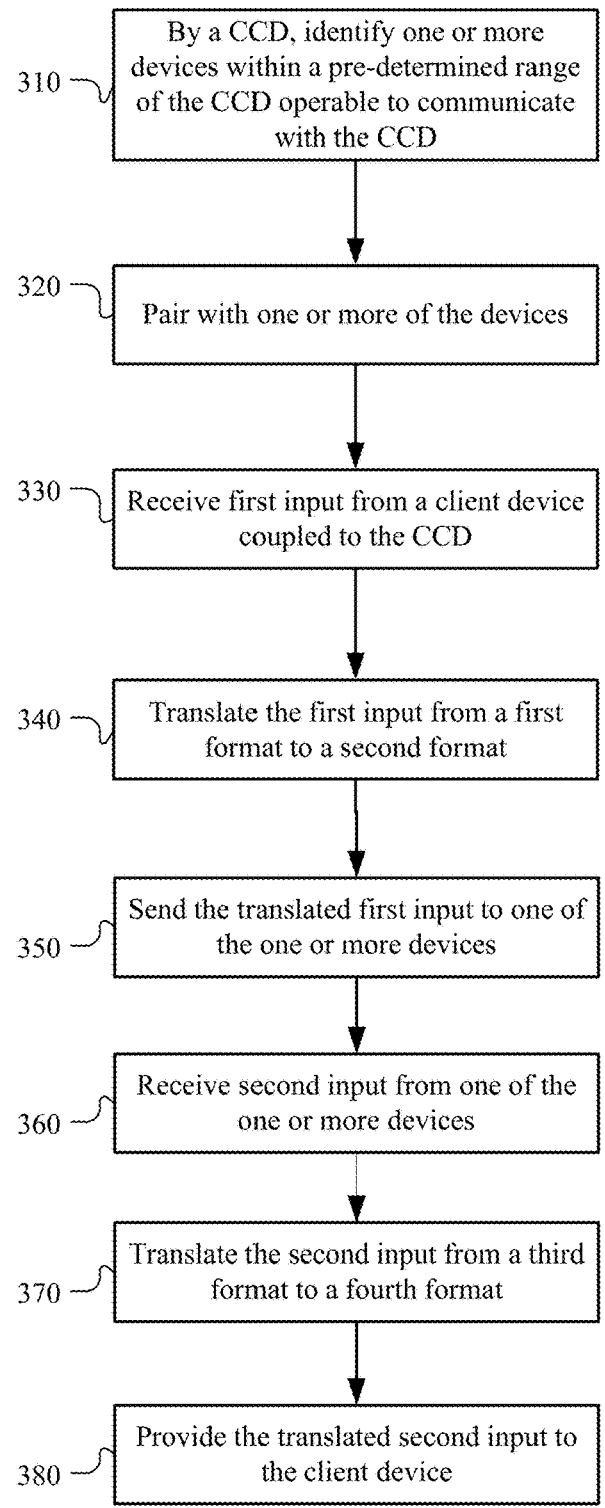
FIG. 3 is flowchart depicting an example method for input redirection with a cloud client device.

FIG. 3 illustrates an example method 300 for input redirection with a CCD. The method may begin at step 310, where a CCD identifies one or more devices within a predetermined range of the CCD operable to communicate with the CCD. At step 320, the CCD pairs with one or more of the devices. At step 330, the CCD receives first input from a client device coupled to the CCD. At step 340, the CCD translates the first input from a first format to a second format. At step 350, the CCD sends the translated first input to one of the one or more devices. At step 360, the CCD receives second input from one of the one or more devices. At step 370, the CCD translates the second input from a third format to a fourth format. At step 380, the CCD provides the translated second input to the client device. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for input redirection with a CCD including the particular steps of the method of FIG. 3, this disclosure contemplates any suitable method for input redirection with a CCD including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
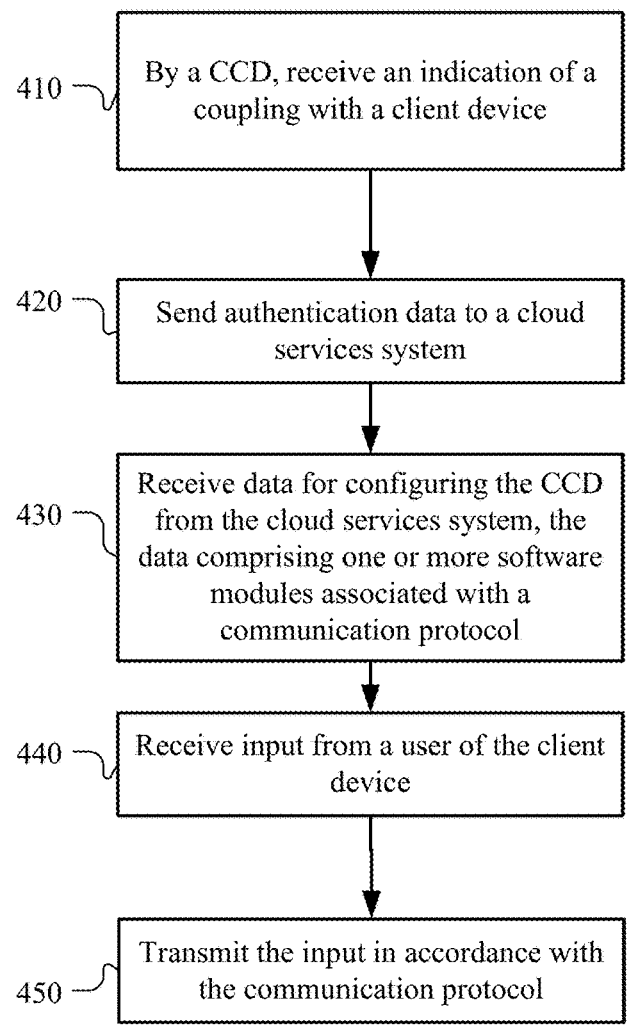
FIG. 4 is flowchart depicting an example method for unified communications with a cloud client device.

FIG. 4 illustrates an example method 400 for unified communications with a CCD. The method may begin at step 410, where a CCD receives an indication of a coupling with a client device. At step 420, the CCD sends authentication data to a cloud services system. At step 430, the CCD receives data for configuring the CCD from the cloud services system, the data comprising one or more software modules associated with a communication protocol. At step 440, the CCD receives input from a user of the client device. At step 450, the CCD transmits the input in accordance with the communication protocol. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for unified communications with a CCD including the particular steps of the method of FIG. 4, this disclosure contemplates any suitable method for unified communications with a CCD including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
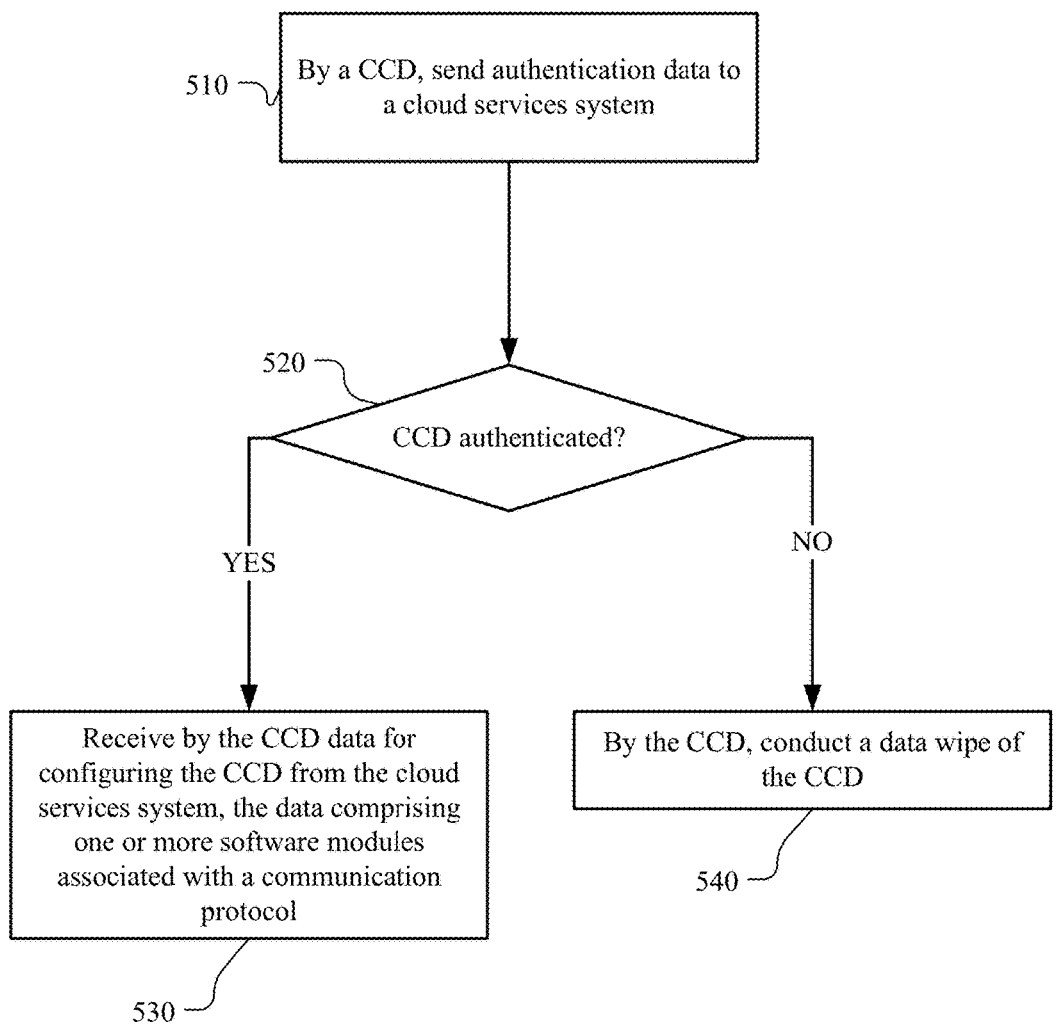
FIG. 5 is a flowchart depicting an example method for recovery or upgrade of a cloud client device.

FIG. 5 illustrates an example method 500 for recovery or upgrade of a CCD. The method may begin at step 510, where A CCD sends authentication data to a cloud services system. At step 520, the cloud services system determines if the CCD is authenticated. If the CCD is authenticated, at step 530, the CCD receives data for configuring the CCD from the cloud services system, the data comprising one or more software modules associated with a communication protocol. If, however, the cloud services system determines the CCD is not authenticated, at step 540, the CCD conducts a data wipe of the CCD. The CCD may be configured to require the cloud services system to authenticate with the CCD. For example, the CCD may be configured to reject the data for configuring the CCD or reject a command to perform a data wipe of the CCD if the data or command is not received with data authenticating the cloud services system with the CCD. The data authenticating the cloud services system with the CCD may be a code associated with the CCD. The manufacturer, a user, or an administrator may set the code associated with the CCD. The data authenticating the cloud services system with the CCD may be changed from time to time by the user or by the cloud services system. Requiring the cloud services system to authenticate with the CCD may be used to prevent others from reconfiguring or wiping a CCD. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for recovery or upgrade of a CCD including the particular steps of the method of FIG. 5, this disclosure contemplates any suitable method for recovery or upgrade of a CCD including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates an example method 600 for providing access to a CCD, such as CCD 100, and a cloud services system, such as cloud services system 260, to a particular user. In particular embodiments, the CCD may authenticate, or provide access to, a particular user by using tones to provide for an even more secure connection. For example, the CCD may include a microphone for receiving tones, such as CCD 232. The microphone can be any microphone or device known to one of ordinary skill in the art for producing electrical signals that represent a received tone or vibration.

The method begins at step 610, where a CCD, such as CCD 232 or a Dell cloud connect device, is connected to a display, such as display 252. In other embodiments, CCD 232 may include a display. The microphone of the CCD may be activated such that it automatically receive tones. The microphone may also initially be in a deactivated state where, for example, a user must activate the CCD or the microphone before the CCD is able to receive tones. To ensure that only a user with appropriate permissions has access to the CCD, the CCD at step 620 prompts the user for a password. Instead of using typed text which may be easy to record or view by a malicious or unauthorized user or system, the present invention uses a tone for each character or input of the password. The tones may be generated using software or hardware known to one of ordinary skill in the art for producing tones. For example, the user may use a keyboard connected to the display to which the CCD is attached, but instead of displaying characters the keyboard generates tones that are received by the microphone of the CCD at step 630. For example, an application may output tones as the user enters the password. The application may reside on a computer, a portable device with a speaker such as a portable media player or a cellular telephone or any other device known to a person of ordinary skill in the art. In other embodiments an analog or digital telephone may be used to provide the tones. In other embodiments, a keypad with speakers and appropriate hardware may provide the tones.

The password may be entered by an individual or software or hardware within range of or with access to the CCD. The tones can be generated using one tone per character. For example, a typical twelve button keypad could be used where each key is represented by a unique tone. The tones can be generated using two tones per character. For example, characters on a keyboard could be represented by using a combination of two tones such that more characters would be available to a user for use as a password. In particular embodiments, a first tone may fall within a certain range of tones and a second tone may fall within a different range of tones. In this manner processing of the tones may be more efficient as the first and second tones represent only a subset of all possible characters where the subset of characters is known based on the position of the tones (as a first tone or a second tone). In other embodiments, more than two tones may be used to represent one character of the inputted password. Any number of tones can be used as representation of a password including tones not audible by the human ear. In particular embodiments, a checksum may be used to ensure that the tones received are the tones that were actually transmitted to the CCD. Any number of checksum generation methods known to one of ordinary skill in the art may be used, for example a 16-bit CRC may be used.

In particular embodiments, the tones may be stored in an appropriate file such that when prompted for a password at step 620, the file is opened and played instead of entering the password manually or in real-time. The password may be sent automatically. For example, an electronic device may in response to the prompt automatically retrieve a password file that includes the appropriate tones and may then send those tones to the CCD without any user interaction.

At Step 640, the CCD translates the received tones for the password to a format interpretable by the CCD. For example, the CCD may translate or convert the tones to a digital representation of the tones. Next, at step 660, a comparison is made to see if the received password matches the password associated with the CCD. If the passwords match, step 680, then the user is permitted access to the CCD. If the passwords do not match, the method continues at step 620. The initial password for the CCD may be set by the manufacturer, upon initialization, by a user or other hardware or software. The password of the CCD may be changed after access is granted. Requiring authentication of a password prevents malicious or unauthorized users or systems from accessing the CCD.

FIG. 7 illustrates an example method 700 for accessing an available network via a CCD. Once a CCD is powered on or made available for use, the CCD may have access to one or multiple networks. For example, one or more networks may be available to the CCD for connection. The CCD may prompt the user at step 710 to select or designate a network from a list of networks, a known network, or from any other method of providing a user with the ability to select a network from available networks as would be known to one of ordinary skill in the art. The user may select a particular available network via arrow keys, a keyboard or any other input device known to one of ordinary skill in the art. To ensure a more secure transaction, the selection by the user may be received by the CCD as a tone or a series of tones at step 720 as discussed with respect to FIG. 6. The tones are translated by the CCD at step 730 and compared to the available networks at step 740. The CCD may then connect to the network at step 760. Before the network connection is fully operational or is accessible by a user, application, device, or other software or hardware, a password may be required to access the selected network which will require authentication similar to the steps shown at 600 in FIG. 6. That is the password to the network may be received by the CCD as a set of tones and translated to a format for comparison with the selected network's password.

In certain embodiments, the network is selected using methods that do not include tones while requiring that the password for access to the selected network be transmitted as a tone or series of tones similar to the method disclosed at 600 in FIG. 6. If the passwords do not match, the method continues at step 710.

FIG. 8 illustrates an example method 800 for providing access to information, hardware, or software associated with a CCD. For example, such information, hardware, or software may include data, websites, networks, storage devices, other CCDs, applications or any other information, hardware, or software known to one of ordinary skill in the art. As an example, the information, hardware, or software may include any such information, hardware, or software depicted in FIG. 2.

In one embodiment, a CCD after connecting to a network may request access to particular information, hardware or software. To provide an additional layer of security, a special code associated with the application may be required to be entered before access is granted to the particular information, hardware or software. For example, a corporate marketing department may have access to certain applications that are not available to those in the finance department. If a user in the finance department attempts to access the marketing-only application, the user may be prompted for a code. Without the specific code associated with the application, the user in the finance department would not be permitted to access to the marketing application. Another example may include providing limited functionality to a user based on the entered code.

Beginning at step 810, the user may be prompted for a code to access, for example, an application. The user may input the code using tones as discussed with respect to FIG. 6. At step 820, the CCD receives the tones representing the code and at step 830 translates the code. At step 840 it is determined if the translated code matches the code associated with the requested application. If the codes match, at step 860 the user is allowed access, otherwise the user is redirected to step 810.

In particular embodiments, the user or system or other hardware or software, may be prompted for a password to the CCD, a network password, and a code sequentially or in any order at initiation or may be prompted at individual stages after access is requested. It may be beneficial for the user to enter all passwords and codes at one instance. If performed automatically, the passwords or codes may be stored in a file and played or executed upon a prompt by the CCD. The passwords or codes may be stored in a single file or multiple files. The files may be opened, executed or played using any manner known to one of ordinary skill in the art. For example, the passwords or codes may be stored as an audio file in an mpeg format and played back using an mpeg player.

In particular embodiments, the passwords and codes discussed in FIGS. 6, 7, and 8 may be encrypted before transmitting to the CCD and upon receipt by the CCD the passwords and codes may be decrypted to allow for comparisons.

It is contemplated that any step in FIGS. 6, 7, and 8 may be performed automatically or manually, in real-time or delayed. A user may be an individual, software, hardware, a system, another CCD or any other type of device known to one of ordinary skill in the art for connecting to a CCD. The CCD may provide updates or status on the connection process for any of the steps in FIGS. 6, 7, and 8. Such updates or status may be provided to a user via a display.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: activating a cloud client device; by the cloud client device, prompting a user for a cloud client device password; by the cloud client device, receiving the cloud client device password as one or more first tones, wherein each character of the cloud client device password is represented by two or more first tones, and wherein at least one of the one or more first tones is not audible by the human ear; by the cloud client device, confirming the one or more first tones based, at least in part, on a checksum; by the cloud client device, translating the one or more first tones, wherein at least a first one of the one or more first tones falls within a first predetermined range of tones, and wherein at least a second one of the one or more first tones falls within a second predetermined range of tones; by the cloud client device, determining whether the translated one or more first tones match a first password, wherein the first password is associated with the cloud client device; by the cloud client device, allowing access to the cloud client device based, at least in part, on the translated first tones matching the first password; by the cloud client device, allowing access to at least one of one or more cloud services and at least one of one or more cloud applications based, at least in part, on a profile associated with the user and a cloud client device profile associated with the cloud client device, wherein the cloud client device profile comprises at least one or more settings, and wherein the one or more settings comprise at least one of an associated user, security, authentication, quality of service, access, and encryption; by the cloud client device, receiving a network selection; by the cloud client device, transmitting a password for access to the selected network as a series of tones; by the cloud client device, providing one or more updates on status of the access; and by the cloud client device, constructing dynamically a virtual set of sensors, wherein the virtual set of sensors are associated with one or more devices, and wherein the constructing comprises pairing the one or more devices by constructing a model of available devices.

2. The method of claim 1, wherein the cloud client device password is encrypted.

3. The method of claim 1 further comprising:
by the cloud client device, prompting the user for a selection of a network from one or more available networks;
by the cloud client device, receiving the selection as one or more second tones;
by the cloud client device, translating the one or more second tones;
by the cloud client device, determining whether the translated second tones correspond to at least one of the one or more available networks; and
by the cloud client device, accessing the selected network based, at least in part, on the translated second tones corresponding to the at least one of the one or more available networks.

4. The method of claim 1 further comprising:
by the cloud client device, prompting the user for a selection of a network from one or more available networks;
by the cloud client device, receiving the selection of the network;
by the cloud client device, prompting the user for a network password;
by the cloud client device, receiving the network password as one or more third tones;
by the cloud client device, translating the one or more third tones;
by the cloud client device, determining whether the translated one or more third tones match a second password, wherein the second password is associated with the selected network; and
by the cloud client device, allowing access to the selected network based, at least in part, on the translated third tones matching the third password.

5. The method of claim 1 further comprising:
by the cloud client device, prompting the user for a first code;
by the cloud client device, receiving the code as one or more fourth tones;
by the cloud client device, translating the one or more fourth tones;
by the cloud client device, determining whether the translated one or more fourth tones match a second code; and
by the cloud client device, accessing information, hardware, or software based, at least in part, on the translated one or more fourth tones matching the second code.

6. The method of claim 5, wherein the information, software, or hardware comprises at least one of an application, a second cloud client device, a website, data associated with the second cloud client device, and one or more storage devices.

7. The method of claim 1, wherein the one or more first tones are stored in a file.

8. An information handling system comprising: a cloud client device comprising a memory, the cloud client device operable to: receive an activation command; prompt a user for a cloud client device password; receive the cloud client device password as one or more first tones, wherein each character of the cloud client device password is represented by two or more first tones, and wherein at least one of the one or more first tones is not audible by the human ear; confirm the one or more first tones based, at least in part, on a checksum; translate the one or more first tones, wherein at least a first one of the one or more first tones falls within a first predetermined range of tones, and wherein at least a second one of the one or more first tones falls within a second predetermined range of tones; determine whether the translated one or more first tones match a first password, wherein the first password is associated with the cloud client device; allow access to the cloud client device based, at least in part, on the translated first tones matching the first password; allow access to at least one of one or more cloud services and at least one of one or more cloud applications based, at least in part, on a profile associated with the user and a cloud client device profile associated with the cloud client device, wherein the cloud client device profile comprises at least one or more settings, and where the one or more settings comprise at least one of an associated user, security, authentication, quality of service, access, and encryption; transmit a password for access to the selected network as a series of tones; provide one or more updates on status of the access; and construct dynamically a virtual set of sensors, wherein the virtual set of sensors are associated with one or more devices, and wherein the constructing comprises pairing the one or more devices by constructing a model of available devices.

9. The information handling system of claim 8, wherein the cloud client device is further operable to:
prompt the user for a selection of a network from one or more available networks;
receive the selection of the network;
prompt the user for a network password;

receive the network password as one or more third tones;
translate the one or more third tones;
determine whether the translated one or more third tones match a second password, wherein the second password is associated with the selected network; and
allow access to the selected network based, at least in part, on the translated third tones matching the third password.

10. The information handling system of claim 8 wherein the cloud client device is further operable to:
prompt the user for a selection of a network from one or more available networks;
receive the selection as one or more second tones;
translate the one or more second tones;
determine whether the translated second tones correspond to at least one of the one or more available networks; and
access the selected network based, at least in part, on the translated second tones corresponding to the at least one of the one or more available networks.

11. The information handling system of claim 9, wherein the client device password is encrypted.

12. The information handling system of claim 8, wherein the cloud client device is further operable to:
prompt the user for a first code;
receive the code as one or more fourth tones;
translate the one or more fourth tones;
determine whether the translated one or more fourth tones match a second code; and
access information, hardware, or software based, at least in part, on the translated one or more fourth tones matching the second code.

13. The information handling system of claim 12, wherein the information, software, or hardware comprises at least one of an application, a second cloud client device, a website, data associated with the second cloud client device, and one or more storage devices.

14. The information handling system of claim 11, wherein the one or more first tones are stored in a file.

15. A non-transitory computer-readable media embodying one or more instructions, wherein the one or more instructions when executed are operable to:
receive an activation command;
prompt a user for a cloud client device password;
receive the cloud client device password as one or more first tones, wherein each character of the cloud client device password is represented by two or more first tones, and wherein at least one of the one or more first tones is not audible by the human ear;
confirm the one or more first tones based, at least in part, on a checksum;
translate the one or more first tones, wherein at least a first one of the one or more first tones falls within a first predetermined range of tones, and wherein at least a second one of the one or more first tones falls within a second predetermined range of tones;
determine whether the translated one or more first tones match a first password, wherein the first password is associated with a cloud client device;
allow access to the cloud client device based, at least in part, on the translated first tones matching the first password;
allow access to at least one of one or more cloud services and at least one of one or more cloud applications based, at least in part, on a profile associated with the user and a cloud client device profile associated with the cloud client device, wherein the cloud client device profile comprises at least one or more settings, and where the one or more settings comprise at least one of an associated user, security, authentication, quality of service, access, and encryption;
transmit a password for access to the selected network as a series of tones;
provide one or more updates on status of the access; and
construct dynamically a virtual set of sensors, wherein the virtual set of sensors are associated with one or more devices, and wherein the constructing comprises pairing the one or more devices by constructing a model of available devices.

16. The media of claim 15, wherein the client device password is encrypted.

17. The media of claim 15, wherein the one or more instructions when executed are further operable to:
prompt the user for a selection of a network from one or more available networks;
receive the selection as one or more second tones;
translate the one or more second tones;
determine whether the translated second tones correspond to at least one of the one or more available networks; and
access the selected network based, at least in part, on the translated second tones corresponding to the at least one of the one or more available networks.

18. The media of claim 15, wherein the one or more instructions when executed are further operable to:
prompt the user for a selection of a network from one or more available networks;
receive the selection of the network;
prompt the user for a network password;
receive the network password as one or more third tones;
translate the one or more third tones;
determine whether the translated one or more third tones match a second password, wherein the second password is associated with the selected network; and
allow access to the selected network based, at least in part, on the translated third tones matching the third password.

19. The media of claim 15, wherein the one or more instructions when executed are further operable to:
prompt the user for a first code;
receive the code as one or more fourth tones;
translate the one or more fourth tones;
determine whether the translated one or more fourth tones match a second code; and
access information, hardware, or software based, at least in part, on the translated one or more fourth tones matching the second code.

20. The media of claim 15, wherein the information, software, or hardware comprises at least one of an application, a second cloud client device, a website, data associated with the second cloud client device, and one or more storage devices.

* * * * *